United States Patent [19]
Sargent

[11] Patent Number: 5,975,645
[45] Date of Patent: Nov. 2, 1999

[54] CARBON BODIED BICYCLE RIM

[75] Inventor: Leigh R. Sargent, Plainfield, Ind.

[73] Assignee: Compositech, Inc., Speedway, Ind.

[21] Appl. No.: 08/925,510

[22] Filed: Sep. 8, 1997

Related U.S. Application Data

[60] Provisional application No. 60/025,692, Sep. 9, 1996.

[51] Int. Cl.[6] .................................................. B60B 5/00
[52] U.S. Cl. ............................. 301/95; 301/55; 301/58; 301/98; 301/95; 301/96; 301/97
[58] Field of Search ............................... 301/55, 58, 95, 301/96, 97, 98, 110.5

[56] References Cited

U.S. PATENT DOCUMENTS

| | | | |
|---|---|---|---|
| 2,489 | 2/1887 | Bown | 301/97 |
| 697,118 | 4/1902 | Van Horn . | |
| 810,860 | 1/1906 | Heart . | |
| 1,968,005 | 7/1934 | Swain . | |
| 1,969,088 | 8/1934 | Maranville . | |
| 3,452,798 | 7/1969 | Ravreby . | |
| 3,656,531 | 4/1972 | Ross et al. . | |
| 3,732,951 | 5/1973 | Hata et al. | 301/97 |
| 3,862,779 | 1/1975 | Jayne . | |
| 4,280,736 | 7/1981 | Raudman . | |
| 4,508,392 | 4/1985 | LeBlond et al. . | |
| 4,639,046 | 1/1987 | Oleff et al. . | |
| 4,732,428 | 3/1988 | Monte . | |
| 4,793,659 | 12/1988 | Oleff et al. . | |
| 4,835,857 | 6/1989 | Michelotti | 29/159 |
| 4,844,552 | 7/1989 | Tsygankov et al. . | |
| 4,919,490 | 4/1990 | Hopkins et al. . | |
| 4,995,675 | 2/1991 | Tsai . | |
| 5,061,013 | 10/1991 | Hed et al. . | |
| 5,080,444 | 1/1992 | Hopkins et al. | 301/97 |
| 5,104,199 | 4/1992 | Schlanger | 301/95 |
| 5,246,275 | 9/1993 | Arredondo, Jr. | 301/95 |
| 5,249,846 | 10/1993 | Martin et al. | 301/95 |
| 5,415,463 | 5/1995 | Olson et al. | 301/110.5 |
| 5,490,719 | 2/1996 | Lew | 301/5.1 |
| 5,540,485 | 7/1996 | Enders | 301/104 |

FOREIGN PATENT DOCUMENTS

| | | | |
|---|---|---|---|
| 2 583 680 | 12/1986 | France . | |
| 2702707 | 9/1994 | France | 301/95 |
| 30 16 862 | 11/1981 | Germany . | |
| 93009963A1 | 5/1993 | WIPO | 301/95 |

OTHER PUBLICATIONS

Specialized Bicycle Components Accessory Catalog, 1990.
Hed Design 1989 Product Price List.
Zipp 3000 Composite Molded Wheel Specification Sheet.
Triathlete Magazine, p. 19, Jun. 1989.
Zipp 3000 Data Sheet.
Aerospoke Advertising Brochure.

*Primary Examiner*—D. Glenn Dayoan
*Assistant Examiner*—Long Bao Nguyen
*Attorney, Agent, or Firm*—E. Victor Indiano; Rose McKinney & Evans

[57] ABSTRACT

A bicycle wheel has good impact properties and increased durability. In one embodiment the rim comprises a two piece rim having a carbon fiber based body portion having bulbous sidewalls for capable of flexing in response to radially directed forces, and a tire engaging, hoop-like rim made from aluminum. The rim includes a pair of parallel braking surfaces. In the preferred embodiment, the convex curved sides of the wheel, in transverse cross section are wider than the braking surfaces and intersect the braking surfaces at an angle of less than about 175°.

20 Claims, 3 Drawing Sheets

CARBON BODIED BICYCLE RIM

This application claims benefit of Provisional Appln. 60/025,692 filed Sep. 9, 1996.

TECHNICAL FIELD OF THE INVENTION

The present relates to bicycle rims, and more particularly to carbon bodied bicycle rims. In one embodiment, a rim having outwardly convex sides rim is used to reduce vibration and impact loads to the frame and rider, while also increasing the impact absorbing capability of the rim, thereby reducing the risk of rim damage.

BACKGROUND OF THE INVENTION

Bicycle rims have been in use for over 100 years. Heretofore, most bicycle rims have been made from steel or aluminum. In the past 15 years or so, many bicycle rim manufacturers have begun to make some of their rims out of carbon fiber composites. Carbon fiber composite rims and wheels are especially attractive to those engaged in racing and other pursuits where the lightweight rims are desired.

Many carbon fiber bicycle rims and wheels exist. Many of these rims and wheels can be seen in the COMPOSITECH, INC. catalog of its the ZIPP SPEED WEAPONRY products. Other carbon fiber rims include one manufactured by Specialized Wheel. The Specialized rim has a solid interior construction. Another prior known rim is the Hed rim, which is disclosed in Hed and Haug U.S. Pat. No. 5,061,013. The Hed and Haug patent discloses a wheel having toroidal side surfaces. Preferably, the wheel, when mated to a tire, has an elliptical cross section. An improvement on the wheel shown in the Hed and Haug patent is the HED CX Wheel.

Another carbon fiber rim is shown in Hopkins U.S. Pat. No. 4,919,490.

When designing a bicycle rim, it is important to take into account the stresses and loads that are imposed on the rim that are caused by the varying road conditions to which the rim will be exposed. These stresses include the vibrational and jarring stresses caused by pot holes and road imperfections, and thermal stresses caused by heat induced due to braking.

The problems induced by vibration have been dealt with in the past largely in terms of employing devices for reducing the vibrations to the cyclist. To accomplish this, many bicycles have employed frame suspensions that were designed to attempt to insulate the rider from road vibrations and impacts. One example of such a framed-suspension design is the ZIPP articulated beam containing carbon bodied bicycle frame, which is shown in many ZIPP catalogs.

Unfortunately, very little engineering effort has been devoted to reducing the impact of vibrational forces upon rims. Very little, if anything, has been done, prior to the present invention, to increase the durability of bicycle rims, through choice of material, shape of the rim, or the use of other designed criteria. Further, no known rim designs have been employed, that permit the rim to be used as a means of absorbing impact energy and vibration. To the contrary, the primary means (and usually the only means) within a bicycle tire and rim combination that has been employed for absorbing impact energy and vibration has been the tire attached to the rim.

The sport of mountain biking, and its increased popularity, has created a need for rims to become more durable and better capable of absorbing impacts. This greater need occurs because of the increased vibration and the jarring impact type forces that are imposed on rims of bicycles ridden over rough mountain terrain.

Additionally, the sport of mountain biking tends to impose relatively greater thermal loading stresses upon the bicycle rim. This increased thermal loading is caused by the heat that is built up between the braking surface of the rim, and the inner, flexible side walls of the rim. The problems caused by thermal build-up can be especially troublesome when a two-piece bicycle rim body is used, wherein the two pieces are made from dissimilar materials, such as metal and carbon fiber, having unmatched co-efficients of thermal expansion.

One object of the present invention is to provide a bicycle rim having a design well suited to absorb a vibrational and jarring stress loads. Another object of the present invention is to provide a rim that is capable of withstanding large amounts of thermal loading caused by brake heat build-up.

SUMMARY OF THE INVENTION

In accordance with the present invention, a bicycle wheel is provided that includes a body portion and a tire engaging rim portion. The body portion has a first side wall and a second side wall. Each of the first and second side walls are bowed outwardly for permitting the body portion to flex in response to radially directed forces. The tire engaging rim portion has a first generally planar braking surface disposed adjacent to the first side wall of the body portion, and a second generally planar braking surface disposed adjacent the second side wall of the body portion.

Preferably, the body portion is comprised of a carbon fiber material, and the rim portion is comprised of a metal rim member that is joined to the carbon fiber body portion. Additionally, the first and second planar ring braking surfaces are preferably disposed in parallel planes. Further, a radially extending line disposed in the plane of the first braking surface intersects a radially extending line disposed tangentially to the first side wall of the body portion at an intersection angle of less than about 175 degrees, and most preferably, of less than about 165 degrees.

One feature of the present invention is that a bicycle wheel rim is provided that includes a bulbous-shaped, carbon body that is attached to an aluminum tire engaging rim portion. The carbon body has a stream-lined bulbous shape, having its narrowest point at the radially inner extreme of the carbon body, and its widest point approximately one-third to one-half the distance from the radially outer-most point (adjacent the aluminum rim portion) to the radially inner-most point.

This feature has the advantage of providing a rim which includes carbon bodied side walls that are capable of flexing to absorb radially directed forces against the rim, such as those forces that would be encountered when the rim hits a pothole, or the radially directed forces caused by the thermal expansion and contraction of the aluminum rim portion.

Another feature of the present invention is that the bicycle wheel is comprised of two major sections (or portions) which may be made of similar or dissimilar materials. The first portion comprises a relatively radially outwardly disposed tire engaging portion. The tire engaging portion includes the substantially parallel braking surfaces. The tire engaging portion also includes first and second circumferentially extending bead engaging portions for engaging a bead of a tire.

The rim portion is substantially rigid in transverse cross section to accommodate brake pad pressure and inflated tire loads. The rim portion is preferably a continuous hoop, or may also be a discontinuous post-joined hoop, which is joined to the carbon body during molding, or alternately joined to the carbon body portion after the carbon body portion is molded, and after the ends of the hoop are joined.

Alternately, the rim portion can also be made in conjunction with the body portion with the same, or similar materials, and molded with the body portion in one operation.

The body portion is disposed relatively radially inwardly of the rim member. In transverse cross-section, the body portion has its radially outer-most point positioned adjacent to the braking surfaces. The carbon body portion includes an aero-dynamically designed, airfoil-like side wall surface. Viewed one way, the carbon body portion begins at the radially outer-most point of a first side wall, and continues radially inwardly in a curved, outwardly bowed, bulbous manner, past its point of maximum axial width, to a radially inner-most point. The side wall then continues radially outwardly to form the second side wall. The second side wall is generally a mirror image of the first side wall, being bulbous and bowed outwardly, so that its point of maximum axial width matches the point of maximum axial width of the first side wall. This point of maximum axial width should be approximately one-third to one-half of the distance from the radially outer-most points of the first and second side walls to the radially inner-most point of the first and second side walls.

The body portion has convex curved sides made of a material exhibiting the properties of a spring material allowing for sidewall flex. This body portion can be made of composite material or any other material exhibiting the desired flex properties. In the case of composites it may be a thermoset or thermoplastic resin, using carbon, glass, aramid and other known structural fibers, either chopped or continuous in nature. The method of molding can be injection molding, open mold, wet laid, resin transfer or pre-preg. It could also be bladder molded, all of these methods and materials being well known in the art of molding.

In the present invention, the inside diameter of the body portion is where the spokes are attached. The inside diameter portion is somewhat independent from the outside diameter comprising the rim portion, including the braking surface, and tire mounting surface or beads. In a traditional bicycle wheel, the tension spokes induce a circumferential compression loading on the rim. Contemporary aerodynamic wheels using two to six compressive spokes, do not induce a circumferential compressive load. With the present invention this circumferential compression loading is reduced even further, thereby permitting the body portion to flex with little restriction.

Preferably, the body portion is formed as a hollow cavity with relatively thin sidewalls. Through this construction, the sidewalls become free to flex in response to radially directed forces.

The radially inner-most portion of the body portion, where the spokes attach, can have localized reinforcement, either by material build up or insertion of a metal hoop. The rim portion can be similar to the body portion in material choice, or can be made from other materials.

Preferably, the rim portion that includes the braking surface and tire mounting surface or beads can be made from an aluminum extrusion and rolled into a hoop. This hoop can be either pinned or welded to produce continuity. This rim portion can also be made of the same material as the body portion but utilizing a core material and a thicker wall structure to acquire adequate strength for withstanding brake and tire loads. In this case the core material could be composed of urethane foam, vinyl foam or syntactic epoxy. In the case where the rim and body portion are comprised of the same material, the rim can be molded as one piece. In the case where the rim is metal, the rim can be post bonded or co-bonded during the molding of the second inner area.

When the rim portion is made of metal, (usually aluminum), and the body portion is made of an advanced composite (e.g. carbon fiber composite), there is a potential for separation (dis-bond) between the rim and body due to induced heat from braking. As the aluminum has a greater thermal co-efficient of expansion than the inner composite area, (particularly if this is carbon fiber), it may break the bond. To overcome this potential dis-bond, the metal rim can be manufactured slightly undersized. It can then be heated at near maximum induced brake heat of 170° Fahrenheit and either post bonded or co-molded at this temperature to the body portion. After complete cure, the two part wheel structure is then allowed to cool to ambient temperature. As the outer aluminum hoop rim shrinks due to cooling, however, the sidewalls of the body portion will flex (bow outwardly) to allow this shrinkage to take place.

The advantage of this is that during induced brake heat, such as when the rider is braking hard, the wheel structure returns to its least stressed state. Generally the adhesives used to post bond the metal outer rim, or resin used in the composite to co-bond the body portion to the metal band are at their highest strengths at ambient temperature, when the induced stresses in the rim are at their greatest. As temperature rises, due to brake induced heat, the adhesives or resin strength decreases, but so does the in-built stress in the wheel, thus substantially lowering the potential of disbond between the two dissimilar materials.

These and other features will become apparent to those skilled in the art upon review of the detailed description presented below, of the best mode of practicing the invention perceived presently.

DETAILED DESCRIPTION

Figure 1:
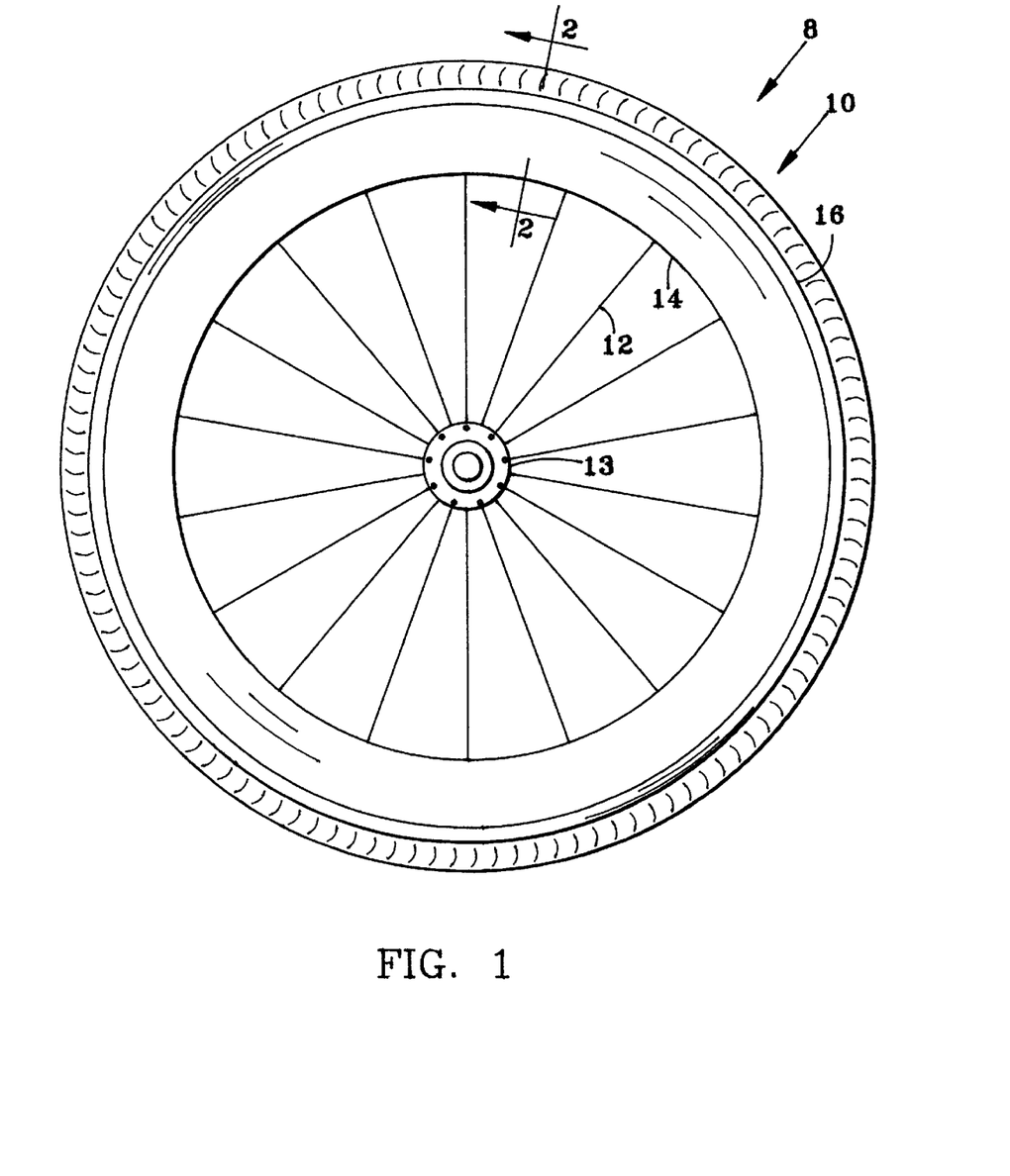
FIG. 1 is a side view of a wheel of the present invention.

The wheel 8, of the present invention includes a rim 10 which is attached by a plurality of radially extending spokes 12 to a central hub 13. The spokes 12 and hub 13 can be of conventional design. Examples of hubs which will work with the present invention are the COMPOSITECH ZIPP® BALLISTIC hubs shown in the most recent edition of the ZIPP® catalog. The spokes can be conventional or bladed spokes, as are well known to those in the art.

The wheel 8 includes a carbon body portion 14, and an aluminum tire engaging rim portion 16. As used in this application, the term "carbon" refers to a carbon fiber containing composite material, which is the preferred material to use in the present invention, examples of which are discussed above.

Figure 2:
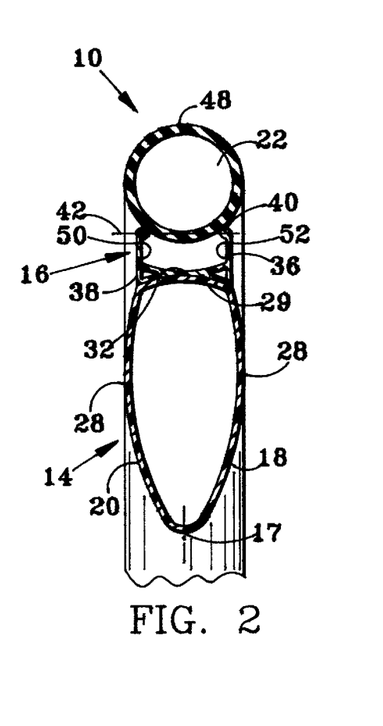
FIG. 2 is a somewhat schematic, sectional view taken along lines 2—2 of FIG. 1.

Turning now to FIG. 2, the carbon body portion 14, includes a radially innermost point 17, a first sidewall 18, a second sidewall 20, and an axially extending, radially outwardly facing, circumferential rim engaging portion 22. Each of the first and second side walls 18, 20 are bowed outwardly, so that the width of the carbon body 14 bows outwardly until it reaches its maximum point 28, which is disposed approximately one-third to one-half of the distance from the radially outermost point 22 to the radially inner most point 17. As one moves along the sidewalls 18, 20 from the maximum width point 28, toward the radially outer portion 22, it will be noted that the width of the carbon body portion 14 of the rim 10 decreases.

An endless extruded aluminum rim portion 16 includes a radially inner surface 29 that engages the radially outwardly facing surface 32 of the radially outer portion 22 of the carbon body portion 14. The aluminum rim 16 also includes a pair of braking surfaces 36, 38. Braking surfaces 36, 38 are not curved in cross section. Rather, the braking surfaces 36, 38 comprise planar rings (linear in cross section) to provide an enhanced surface for engagement by the caliper-type brakes (not shown) of the bicycle.

The extruded aluminum rim member 16 includes a pair of generally continuous circumferential bead members 40, 42 that are provided for engaging the inner bead of the tire 48 which is shown schematically in FIG. 2. It will be appreciated, that an actual tire has more of a "horse shoe" shape, (see e.g. FIG. 7) wherein the ends of the tires terminate in outwardly extending lips for engaging the radially inwardly facing surfaces 50, 52 of the tire engaging portion of the aluminum rim 16. The lips 159, 165 (FIG. 7) of the tire generally engage the radially inwardly facing surfaces 50, 52 just below the tire engaging beads 40, 42 of the aluminum rim member 16.

The aluminum hoop rim 16 is attached to the carbon body 14. The carbon body 14 has a bulbous shape, having its narrowest point 17 at the radially inner extreme of the carbon body 14. The widest part 28 of the carbon body 14, is approximately one-third to one-half the distance from the aluminum rim 16 to the radially inner most point 17. Typically, the width of the widest part 28 is about 22 to 35 mm in rims used with racing or touring wheels. However, with wheels used in mountain bikes, the widest part of the wheel could be up to 70 mm.

The endless aluminum hoop rim 16 circumferentially surrounds the carbon body through 360°. The aluminum rim portion 16 can be made in either of two different ways. One way to make the aluminum rim 16 is to make it as a "clincher" type rim, such as shown in FIG. 2. Clincher type rims are designed to engage clincher type tires, which are the type of tires used most widely with bicycles. Alternately, the aluminum rim 16 can be made to take "sew-up" or "tubular" type tires. Rims that are designed for sew-up wheels typically do not have beads, and have a tire mounting surface similar to that shown in FIG. 5.

The clincher rim is adapted to receive a tube and tire arrangement, and to clinch the bead of the tire onto the rim 10. In non-clincher wheels, the tire and tube are actually glued onto the rim.

It has been found by the applicant that the use of the carbon body portion 14 with an aluminum rim portion 16 provides some manufacturing advantages. For example, when manufacturing clincher type wheels, it is difficult to mold a carbon fiber material to create a bead section 40, 42 that is strong enough to withstand the pressure exerted thereon. As such, using the aluminum section 16 helps to make the manufacture of the wheel 8 easier.

The aluminum rim 16 includes two parallel planar braking surfaces 36, 38. The parallel, planar-ring shaped braking surfaces 36, 38 are provided for being engaged by the caliper type brakes of the bicycle. By having the braking surfaces 36, 38 both planar and parallel, the orientation of the calipers upon the braking surfaces 36, 38 is optimized. Additionally, for proper engagement, the brakes require a certain amount of radially extending length measured in a direction shown generally by line L of FIG. 3 for optimization of brake engagement.

The carbon body 14 is generally hollow, with curved sidewalls 18, 20. The carbon body portion 14 preferably should be hollow (and not filled) for the wheel to operate correctly.

The carbon body portion 14 sidewalls 18, 20 are curved from the rim engaging radially inner surface 32 to the radially inner-most point 17. The sidewalls 18, 20 are actually wider than the braking surfaces 36, 38 of the aluminum rim 16. The radially outer-most, aluminum rim engaging surface 32 of the body portion 14 is curvilinear and somewhat "convex" to provide a good surface to which the aluminum rim 16 can bond. As shown in FIG. 2, the convex nature of the rim engaging surface provides a circumferential "crown" that extends around the circumference of the carbon body portion 14.

The aluminum rim 16 is bonded to the carbon body 14, through a combination of glue and mechanical pressure. By making the rim engaging portion 32 of the carbon body 14 somewhat crowned, the aluminum rim 16 can grab onto the rim-engaging surface 32, and is less prone to move laterally off of its engagement with the carbon body 14, even if the glue that is placed between the rim 16 and the carbon body 14 fails. Although the shape of the bonding surface 32 between the aluminum rim portion 16 and the carbon body 14 can take one of an infinite number of forms and still function, it is best to create an interface shape between the carbon body 14 and rim portion 16, that will promote the continued adhesion of the carbon body 14 to the rim portion 16, even if the glue or other adhesive that is placed between the two were to fail. As such, one would not want the rim engaging surface 32 to be perfectly planar, as a perfectly planar surface would be less likely to resist lateral movement of the rim 16 on the rim engaging surface 32 than a "crowned" surface.

As alluded to earlier, aluminum rim portion 16 also mechanically bonds to the carbon body 14. Because of the shape of the surfaces 29, 32 of the rim 16 and carbon body 14, respectively, when the aluminum rim portion 16 is joined to the carbon body 14, it is unlikely to come off because of the mechanical engagement therebetween.

Figure 3:
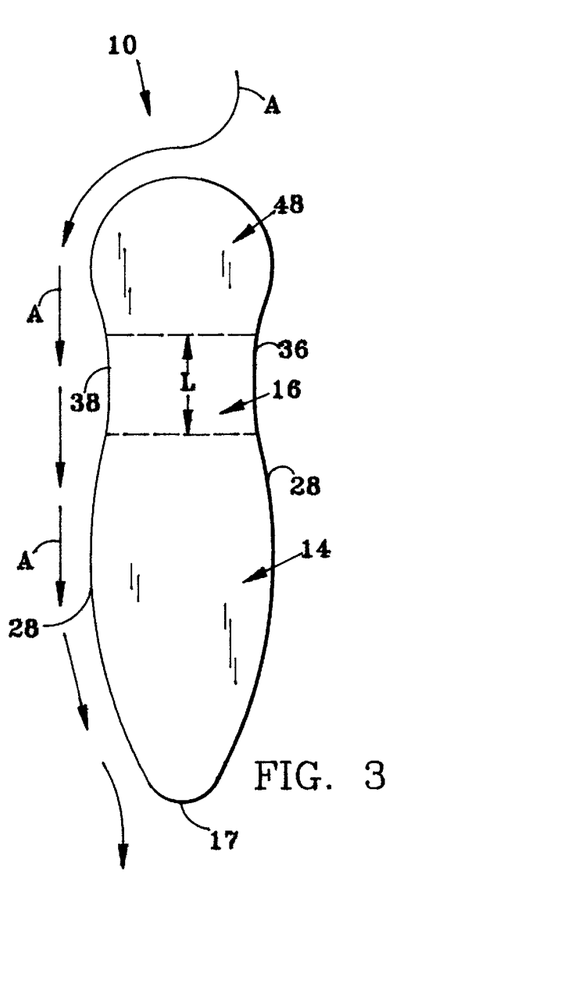
FIG. 3 is a profile view of a wheel and tire combination of the present invention.

One of the advantages achieved with the present invention is the manner in which in racing sized wheels (as opposed to mountain bike sized wheels), a regenerative airflow is created as the wheel and rim 16 are moving through the air. As best shown in FIG. 3, when the tire 48 engages the aluminum rim 16 and carbon body 14, the cross-sectional profile of the wheel 8 is somewhat "peanut" shaped. From an aerodynamic standpoint, as air moves around the side surface of the wheel 8, it moves in a direction shown generally by arrow A. The tire 48 "cuts" the air, forcing it around the sidewalls of the tire 48. The air moves outwardly as it passes the tire 48. However, as the tire 48 is generally wider than the braking surface 16, the air "detaches" as it approaches the area of the braking surfaces 36, 38. This induces some small amount of turbulence. As the air continues toward radially inward most point 17, it reattaches at the wide portion of the carbon body 14. To some extent, the degree of detachment of the air from the wheel 8 that occurs at braking surface 36, 38 will largely be a function of width of the tire 48. Notwithstanding the fact that the air "detaches", the bulbous sidewalls 18, 20 of the carbon body 14 enable the air to reattach so that it flows smoothly off the radially inward point 17 of the rim.

One of the features of the present invention is that the bulbous carbon body 14 helps to provide for smooth air flow along the trailing edge 17 of the airfoil shaped rim/wheel 8. As discussed above, braking ability is optimized if one uses parallel braking surfaces 36, 38. The use of the parallel braking surfaces 36, 38 causes some turbulent flow of the air that passes in the area adjacent to the braking surfaces 36, 38. However, the use of the bulbous carbon body portion 14 causes the air to reattach, and provides good aerodynamic flow of air off the trailing edge 17 of the wheel 8. As such, good aerodynamic properties are achieved, even though some detachment of air occurs.

Another feature that the bulbous shape of the body portion 14 provides is that one can use tires having various widths, while still providing good air flow characteristics. As the air is reattached along the carbon body portion 14 after passing the braking surfaces 36, 38, tires of various widths can still be used, while still permitting the carbon body 14 to reattach the air to provide good aerodynamic flow off the trailing edge 17. This regenerative type air flow is not believed to be known in the prior art.

With respect to structural manufacturing advantages of the present invention, it should first be noted that the carbon body 14 is generally hollow. This permits the carbon body 14 to have the ability to flex, and the bulbous sidewalls 18, 20 contribute to this flex. The flex helps to extend the tire life, especially when the tire and rim 10 are used over rough terrain surfaces, such as would be typical when the rim 10 is attached to a mountain bike, or a street bike. In this regard, one of the previously alleged drawbacks of the use of a carbon rim, is that because of the inherent stiffness of carbon, the longevity of the carbon fiber rim could be reduced substantially if it were ridden over potholes and bumps. It was believed that the stiffness of the carbon would cause the carbon to break if it were treated too roughly. However, because of the bulbous nature of its sidewalls 18, 20 the rim 10 of the present invention is capable of flexing when the rim 10 hits a pothole, thereby absorbing the shock somewhat.

Another feature of the bulbous carbon body relates its ability to be manufactured. To manufacture the carbon body 14 of the present invention, the carbon rim 14 is first manufactured in a mold, and the mold grabs the wheel along its side along the mold split line. In the present invention the applicant has found that the preferable place for the mold split line is at the radially inner most point 17, and the middle of the rim engaging surface 32.

After the carbon body rim 14 is made, the aluminum hoop-like rim portion 16 is placed around the rim engaging surface 32 of the carbon body 14. In order to do this, the endless aluminum rim 16 is heated and thereby expanded, and then placed around the rim engaging surface 32. In order to do this, the hoop-like rim 16 is cut so that it is no longer an endless hoop, but rather a discontinuous hoop having two, unjoined ends.

The hoop is cut, heated, and placed around the carbon section 14. The ends of the discontinuous aluminum hoop rim 16 are then joined by welding or by pinning, and the aluminum rim 16 is allowed to cool. As the aluminum rim portion 16 cools, the inner diameter of the aluminum rim portion 16 shrinks. This shrinkage helps to mechanically bind the aluminum rim 16 to the carbon body 14. During the shrinkage process, the bulbous nature of the carbon body's sidewalls 18, 20 permits them to "bow laterally outwardly further" to accept the shrinkage caused by the cooling of the aluminum rim 16. However, before the aluminum rim 16 has joined the carbon body 14, a glue is placed on either or both of the rim engaging surface 29 of the aluminum rim, and the rim engaging surface 32 of the carbon body 14 to provide a chemical/glue bond between the carbon body 14 and the aluminum rim 16.

Another way in which the wheel can be manufactured is co-bonding. In such a case, a full aluminum hoop rim 16 is placed in the mold along with the carbon. The aluminum is placed in the mold at an elevated temperature, and is heated in the mold, along with the hot carbon. As the aluminum rim 16 cools, it shrinks against the carbon body portion 14, causing the sidewalls 18, 20 of the carbon body portion 14 to flex (bow) outwardly.

A third way of manufacturing the device is to slip an endless hoop-like aluminum rim 16 onto an already molded carbon body. However, the problem with this approach is that it is difficult to place the endless hoop over the rim engaging surface 32 of the carbon body 14, unless the rim engaging surface 32 of the carbon body 14 is generally planar. As discussed above, this would have a disadvantage of increasing the potential of the rim 16 to become disengaged from the carbon body 14, if the glue bond between the rim 16 and carbon body 14 were to fail.

As discussed above, the preferred method is to cut the aluminum endless loop, heat it up, stretch it around the rim engaging surface 32, join the "ends" of the aluminum rim 16 together, so as to form an endless rim, and then allow the aluminum rim 16 to cool. As the aluminum rim 16 cools, the aluminum shrinks, which tends to exert a radially inwardly directed force against the carbon body 14. This radially inwardly directed force tends to cause the sidewalls 18, 20 of the carbon body 14 to flex outwardly or to bow outwardly, inducing flex in the carbon body 14. If the sidewalls 18. 20 of the carbon body 14 did not have some "beginning" bow to them (that is if they were planar and not bowed slightly outwardly to start with), then the shrinking of the aluminum rims 16 would tend to compress the sidewalls in a radial direction without the bow, thus possibly causing structural problems on the carbon body 14.

Therefore, the placement of a certain amount of bow in the sidewalls 18, 20, prior to joining the rim 16, helps to ensure that radial compression exerted by the cooling of the aluminum rim 16 as it shrinks will not break the aluminum hoop 16 or structurally impair the body portion. As the carbon sidewalls 18, 20 have some flex in them, the radially outwardly directed force exerted on the aluminum rim 16 by the carbon body 14 is lessened, thus reducing the likelihood that the aluminum hoop 16 will split under the radially outwardly exerted pressure caused by the carbon body 14.

It has been found by the applicant that the more planar the sidewalls 18, 20, the more likely it is that the sidewalls 18, 20 will not flex but instead will actually force the aluminum rims 16 outwardly, preventing it from shrinking, even though it is cooling. This would tend to cause a great deal of stress within the wheel, as the aluminum rim 16 would be forced to be stretched, while the carbon sidewalls 18, 20 of the wheel carbon rim body portion 14 would be simultaneously physically compressed, thus creating problems during cool down.

The applicant has found that the best temperature at which to heat the aluminum during its joinder process to the carbon body 14 is approximately 170° F. This temperature is chosen because it is the approximate brake temperature that a rim 10 of this type can achieve, during heavy braking at high speeds. As 170° F. is the temperature at which it is cured, brake-induced heating would cause the aluminum rim 16 to expand into its "natural state" as opposed to its relatively compressed, cooled down state. As 170° F. is the temperature at which the aluminum wheel rim 16 is bonded to the carbon body 14, this heating of the rim 16 during braking causes the aluminum rim 16 to expand, and the carbon sidewalls 18, 20 to relax from their relatively compressed position. As such, there is generally neither stress in the aluminum caused by the aluminum compressing the carbon, nor is their stress in the carbon trying to force itself radially outwardly toward the aluminum rims 16 when braking.

Additionally, by choosing this 170° F. curing temperature, the stresses of the aluminum rim 16 and carbon body 14 are designed so that when the most heat stress is being placed on the wheel such as by braking, the wheel is actually experiencing the least amount of physically induced structural stress within the structure of the rim 10. This presents a good compromise design strategy. However, if one had bonded the aluminum rim 16 bonded to the carbon body 14 at ambient temperatures (e.g. 70° F.), the rim 10 under braking conditions would not only be under a tremendous amount of thermal stress caused by the heating of the aluminum rim 16, but additionally, the rim 10 would be under a great deal of bonding "stress", as great physical bonding strength would be required to keep the aluminum rim 16 and carbon body 14 together and joined, especially as the aluminum rim 16 would have expanded due to the heat.

By having the sidewalls 18, 20 formed to be bulbous, the carbon sidewalls 18, 20 are allowed to flex under stress so if you exert a radially inwardly directed force against the sidewalls 18, 20, such as would occur when you hit a pothole hard or a bump, sidewalls 18, 20 can flex because they are at an angle from that load.

When used on mountain bikes, the bulbous sidewalls can help counteract the typical phenomena that result in tire and/or rim failure. One typical phenomena occurs where a tire compresses between what it hits (e.g. the pot hole), and the bead of the rim, to thereby create a flat tire. Because the carbon body 14 is flexible, as that compression happens, the sidewalls 18, 20 can flex. This flex cannot generally occur with a fully aluminum rim. Because of this flex, the carbon sidewalls 18, 20 of the carbon body 14 can at least partially absorb the shock, and thereby lessen the likelihood of a flat tire.

Additionally, because of the ability of the carbon sidewalls 18, 20 to absorb the impact, an aluminum rim portion 16 is less likely to become bent when it hits a sharp object such as a pothole, when compared to a fully aluminum rim. It should be noted that the carbon wheel has "memory", so that when the load is relieved, the carbon sidewalls 18, 20 will flex outwardly to their "pre-flexed" position, to bring the aluminum rim portion 16 back to its original point.

A third advantage provided by the bulbous sidewalls 18, 20, is that they help to prevent the wheel from "pretzeling".

When the wheel 8 is joined with a hub 13 and spokes 12, the rim 10 is under circumferential, radially inwardly directed compression. The rim 10 wants to relieve that stress and will create what is a wiggle or pretzel effect in the rim 10 to be able to reduce its size, and thereby reduce the tension in the spokes 12. Because of the bulbous sidewalls 18, 20, the carbon body 14 and hence rim 10 have a lateral strength. The rim 10 and carbon body 14 have the ability to sustain themselves in a flat plane far beyond the ability of conventional wheels or other carbon rims that are on the market, that are used in connection with laced, tensioned spokes.

It should further be noted that the bulbous sidewalls 18, 20 also help reduce "gator" pinch on the tire. Gator pinch occurs when the tire 48 hits a bump, and the rim 16 pinches the sidewall of the tire 48 against the radially outer edge 40, 42 of the rim 16. In extreme cases of gator pinch, the very thin tires typically used in connection with carbon rims can permit the bead 40, 42 to actually slash the tire 48 because of tremendous peak load induced on the tire 48 when it is flexed hard such as by hitting a sharp object such as a pothole.

To manufacture the wheel of the present invention, the carbon hollow section 14 of the wheel is first molded. Then, an aluminum hoop 16 is cut, so that the endless hoop has two ends. Adhesive is then placed on the radially outwardly facing surface 32 of the carbon body 14, and the rim 16 is placed around the carbon body 14, and the ends of the rim 16 are joined together at the elevated heat. Prior to the rim 16 ends being joined, the aluminum rim 16 is heated to approximately 170° F. The adhesive is allowed to set up and cure at this 170° temperature. The rim 16 containing wheel is then removed from the heating unit, and the aluminum rim 16 is allowed to shrink onto the carbon body portion 14. From a manufacturing standpoint, this process enables the manufacturer to provide a wheel that is under a low amount of structural stress during times when high brake heats are applied to the wheel. The compression of the rim 16 as it shrinks onto the carbon body 14 also provides a good amount of mechanical bonding between the carbon body portion 14 and the rim 16.

The carbon body 14 can be formed through the use of a dry fiber, to which resin is added. Also, it can be done through a pre-preg type system, wherein the resin is already placed in the fiber before it is molded. Further, one can also perform resin transfer or a bladder molding because one of the reliant things of this structure is that it is hollow. As such, it cannot be filed with foam or honeycomb and so forth. Additionally, the carbon body 14 can be injection molded with a typical injection mold material such as a nylon, polyethylene, polypropylene, with a carbon fiber or a glass fiber. One can also utilize a glass fiber in place of a carbon fiber. However, that would change the performance characteristics of the wheel, although there would still be inherent sidewall flex, when mated with an aluminum rim 16 that shrinks during manufacture.

To join the rim 16 to the wheel 14, an epoxy adhesive is used. Various types of adhesives that may serve well in the present invention include acrylics, epoxies, methylmethacryate, cyan adhesives and the like. The preferred adhesive is an epoxy adhesive. With regard to the temperature at which bonding occurs, the preferable temperature is around 150–220° F. However, it is possible to still bond at as low as 120° F., or possibly as high as 300° F. To some extent, the bonding temperature is also dependant upon the nature of the adhesive, and the appropriate curing time for it.

With respect to the degree of bulbousness of the wheels, the degree of bulbousness (radius of curvature) could vary depending upon the amount of flex that one would wish to induce in the wheel. For example, mountain bikes are often ridden over very rough terrain. As such, a rim and wheel structure 8 for a mountain bike would typically have more bulbous sidewalls 18, 20, with a higher degree of flex. Conversely, a track bike generally rides on a smooth surface. As such, flex is not important, and the degree of bulbousness can be reduced. Viewed another way, on mountain bike wheels it may be advisable to use a carbon body portion 14 wherein the sidewalls have a smaller radius of curvature then the wheels used on track bikes.

Figure 4:
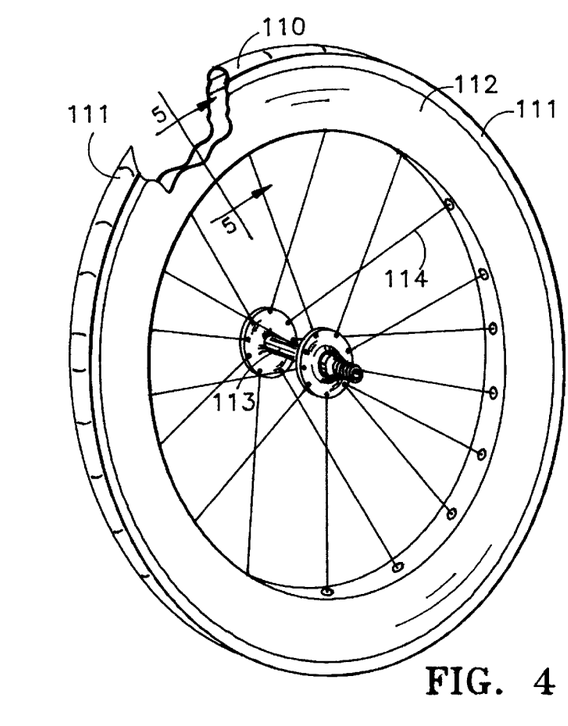
FIG. 4 is a perspective view of a bicycle wheel with tire, in accordance with the invention.

Referring to FIG. 4, a bicycle wheel 100 is depicted showing a tire mounted thereto 110. The wheel 100 includes a pair of planar-ring, parallel and opposing brake surfaces, such as surface 111. Wheel 100 also includes a convex curved carbon body sidewalls 112, a center hub 113 and a plurality of spokes 114.

Figure 5:
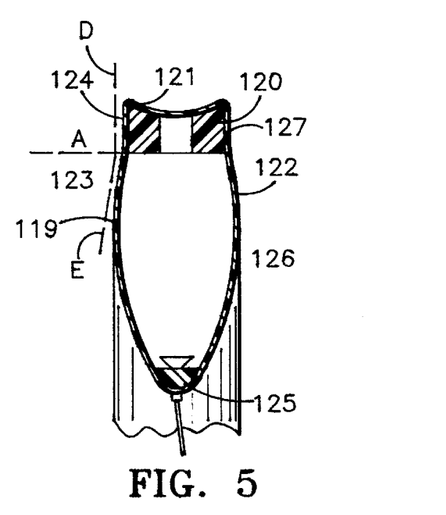
FIG. 5 is a transverse cross section as formed by lines 5—5 in FIG. 4, showing an alternate embodiment rim molded at one time using same materials.

In FIG. 5, a cross section of a wheel 100 is shown which is molded to be a one-piece wheel wherein the rim portion and body portion are made from a similar materials, in contrast to the two-piece wheels of FIGS. 1–3 and 6–7. The wheel of FIG. 5 has a tire mounting surface 121, a pair of straight and parallel braking surfaces 124 and 127; and a filled area of core material 120. An acute angle 123 is formed between the braking surface 124 and the first flexible sidewalls 119 and a line A generally parallel to the axis of the rim (see angle 123 and line A of FIG. 5). Viewed another way, a radially extending line D that is disposed in the plane of the first braking surface 124 would intersect a radially extending line E that is disposed tangentially to the first sidewall 119 of the body portion, at an axially outwardly facing intersection angle of less than 175°, and preferably less than 165°. The body portion extends from the first braking surface 124 to the second braking surface 127, and includes first 119 and second 122 sidewalls, and a hollow interior 126. The bulbous carbon body portion 134 includes a reinforced inner diameter portion, having spoke attachment points which are typically apertures, and which may include a metallic insert 125 for serving as an anchor for the spoke.

Figure 6:
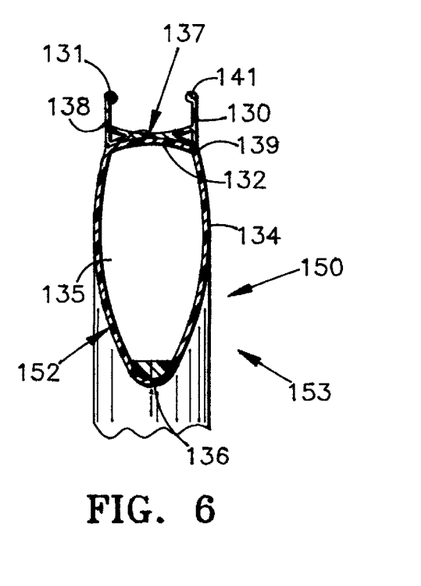
FIG. 6 is a transverse cross section as formed by lines 5—5 in FIG. 4, showing an alternate embodiment rim with an aluminum first area and a composite second area.
Figure 7:
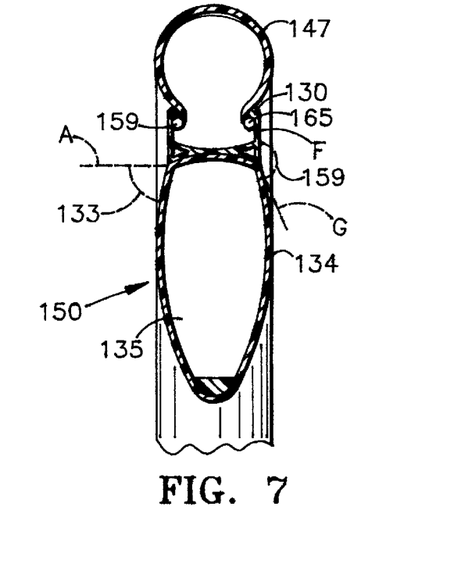
FIG. 7 is the same as FIG. 6 except that a tire is mounted to said rim.

FIGS. 6 and 7 show a transverse cross section similar to FIG. 2 for a two-piece wheel. This rim 150 is made of two dissimilar materials, including an aluminum tire engaging rim 137 having two parallel opposed braking surfaces 130, 138. The rim 137 also includes a pair of circumferential bead engaging members 131, 141, that are provided for engaging the beads 159, 165 of the tire 147.

The carbon body portion 153 includes a first sidewall portion 134 extending from the radially outer-most part 139 where the first sidewall intersects with the first braking surface 130, past the point of maximum width, and terminates at the radially inner-most point 136, which is shown as being thicker than the sidewall 134, and thereby being reinforced. The carbon body portion 153 includes a second sidewall portion 152 which extends between the intersection with the second braking surface 138 of the rim portion 137, and the radially inner-most point 136. The axially extending, radially outwardly facing rim engaging surface 132, includes a circumferential crown portion. The interior 135 is hollow to facilitate flex of the sidewalls.

A radially extending line F that is disposed in the plane of the first braking surface 130 intersects a radially extending line G that is disposed tangentially to the first sidewall 134 of the body portion 153 at an axially outwardly facing intersection angle 159. Intersection angle 159 should be less than 175°, but preferably is about 165° for road bikes and about 150° for mountain bikes. An acute angle 133 is formed between a line A perpendicular to the braking surface 138 and the first flexible sidewall 152 (see angle 133 and line A of FIG. 7).

FIG. 7 shows the same rim 150 as FIG. 6 but shows the rim 150 having a tire 147 mounted thereto, showing the combined shape of tire and rim to be that of an unshelled peanut, or two bulb areas joined by a straight section.

What it claimed:

1. A bicycle wheel comprising
   (a) a body portion having a first sidewall and a second sidewall, each of the first and second sidewalls being bowed outwardly for permitting the body portion to flex in response to radially directed forces, and
   (b) a tire engaging rim portion having a first generally planar braking surface disposed adjacent the first sidewall of the body portion, and a second generally planar braking surface disposed adjacent the second sidewall of the body portion,
   wherein the first sidewall bows outwardly from the first braking surface to a first maximum width point of the body portion, and the second sidewall bows outwardly from the second braking surface to a second maximum width point of the body portion, the width of the body portion between the first and second maximum width points being greater than the width of the rim between the first and second braking surfaces.

2. The wheel of claim 1 wherein the body portion is comprised of a carbon fiber material, and the rim portion comprises a metal rim member joined to the carbon fiber body portion.

3. The wheel of claim 1 wherein
   (a) the first and second planar braking surfaces are disposed in generally parallel planes; and
   (b) a radially extending line directed toward the rim portion from the interface of the body portion and the rim portion and disposed in the plane of the first braking surface intersects a radially extending line directed toward the body portion from the interface of the body portion and the rim portion and disposed tangentially to the first sidewall of the body portion at an intersection angle of less than about 175°.

4. The wheel of claim 3 wherein the intersection angle is less than about 165°.

5. The wheel of claim 1 wherein
   (a) the first and second planar braking surfaces are disposed in generally parallel planes;
   (b) a radially extending line directed toward the rim portion from the interface of the body portion and the rim portion and disposed in the plane of the first braking surface intersects a radially extending line directed toward the body portion from the interface of the body portion and the rim portion and disposed tangentially to the first sidewall of the body portion at an angle of less than 180°; and
   (c) the radial inner-most point of the body portion includes a series of apertures to which spokes may be attached.

6. The wheel of claim 1 wherein the body portion comprises a hollow carbon material body portion and each of the first and second sidewalls of the hollow carbon body portion includes a radially inner-most point, a radially outer-most point and a maximum width point disposed between the radial inner-most and outermost points, the cross-sectional width of the hollow carbon body portion being greater at the maximum width point than at the radially inner-most point and the radially outer-most point.

7. The wheel of claim 1 wherein the rim portion comprises a metal rim member, joined to the body portion, and the body portion comprises a carbon body portion.

8. The wheel of claim 7 wherein the carbon body portion includes a radially outwardly facing rim engaging surface, the rim engaging surface including a crown portion for retarding axial movement of the rim member.

9. The wheel of claim 8 wherein the crown portion comprises a circumferentially extending crown.

10. The wheel of claim 7 wherein the carbon body portion includes a radially outwardly facing surface, and the metal rim member includes a radially inwardly facing body portion engaging surface, the rim member exerting a radially inwardly directed compressive force on the body portion at room temperature, the radially inwardly directed compressive force being reduced as the rim member is heated during use, the rim member being joined to the carbon body portion by heating the metal rim, placing the radially inwardly facing surface of the metal rim into engagement with the radially outwardly facing rim engaging surface of the carbon body portion, and allowing the rim member to cool on the carbon body portion.

11. The wheel of claim 10 wherein the first and second sidewalls are sufficiently flexible to bow outwardly in response to the radially inwardly directed compressive force imposed on the carbon body portion by the cooling metal rim member.

12. The wheel of claim 10 wherein the first and second sidewalls are sufficiently flexible to decrease their radius of curvature in response to the radially inwardly directed compressive force imposed on the carbon body portion by the contraction of metal rim member, and to increase their radius of curvature upon the expansion of the metal rim member.

13. A bicycle wheel comprising
(a) a hollow carbon-based body portion having a first sidewall and a second sidewall, each of the first and second sidewalls having a radially innermost point, a radially outer-most point and a point of maximum axial width disposed between the radially inner-most point and the radially outer-most point, the radially innermost point, point of maximum axial width, and radially outer-most point defining a radius of curvature over the hollow body portion sufficient for permitting the first and second side walls to flex in response to radially directed forces, and (b) a metal tire engaging rim member having a first generally planar-ring braking surface disposed adjacent the first sidewall of the hollow [carbon] body portion, and a second generally planar-ring braking surface disposed adjacent the second sidewall of the hollow body portion.

14. The wheel of claim 13 wherein the first generally planar-ring braking surface is disposed in a plane generally parallel to the second generally planar ring braking surface.

15. The wheel of claim 14 wherein a radially extending line directed toward the rim member from the interface of the body portion and the rim member and disposed in the plane of the first braking surface intersects a radially extending line directed toward the body portion from the interface of the body portion and the rim member and disposed tangentially to the first sidewall of the body portion at an axially outwardly facing intersection angle of less than about 175°.

16. The wheel of claim 15 wherein axially outwardly facing intersection angle is less than about 165°.

17. The wheel of claim 14 wherein a radially extending line directed toward the rim member from the interface of the body portion and the rim member and disposed in the plane of the first braking surface intersects a radially extending line directed toward the body portion from the interface of the body portion and the rim member and disposed tangentially to the first sidewall of the body portion at an axially outwardly facing intersection of less than 180°, and wherein the radially innermost point of the carbon body portion includes a series of apertures to which a series of spokes can be attached.

18. The wheel of claim 15 wherein the carbon body portion includes a radially outwardly facing rim engaging surface, the rim engaging surface including a crown portion for retarding axial movement of the rim member.

19. The wheel of claim 15 wherein the metal rim portion includes a first bead engaging member disposed adjacent the first planar-ring braking surface and a second bead engaging member disposed adjacent to the second planar-ring braking surface, the first and second bead engaging members being positioned for engaging beads of a tire.

20. The wheel of claim 13 wherein the point of maximum axial width is disposed between about one-third and one-half of the distance from the radial outer-most point to the radial inner-most point.

* * * * *

UNITED STATES PATENT AND TRADEMARK OFFICE
CERTIFICATE OF CORRECTION

PATENT NO. : 5,975,645
DATED : November 2, 1999
INVENTOR(S) : Leigh R. Sargent

It is certified that error appears in the above-identified patent and that said Letters Patent is hereby corrected as shown below:

Column 13, line 36,

In the patent, in Claim 13(b) please delete the word "[carbon]" after the word hollow and before the word body.

Signed and Sealed this

Twentieth Day of June, 2000

Attest:

Q. TODD DICKINSON

*Attesting Officer*   *Director of Patents and Trademarks*